ized, forming an exhaust gas stream comprising sulfur dioxide, which is then contacted with water or reactant and water solution or slurry to destroy or convert $SO_2$ into a less environmentally harmful compound.

United States Patent
George, III

(10) Patent No.: US 11,224,835 B2
(45) Date of Patent: Jan. 18, 2022

(54) METHODS FOR THE CAPTURE OF GASEOUS SULFUR-CONTAINING COMPOUNDS FROM A NATURAL GAS CONTAINING HYDROGEN SULFIDE

(71) Applicant: Fisher AGC, LLC, Houston, TX (US)

(72) Inventor: John Fisher George, III, Houston, TX (US)

(73) Assignee: Fisher AGC, LLC, Houston, TX (US)

( * ) Notice: Subject to any disclaimer, the term of this patent is extended or adjusted under 35 U.S.C. 154(b) by 0 days.

(21) Appl. No.: 16/616,746

(22) PCT Filed: May 25, 2018

(86) PCT No.: PCT/US2018/034657
§ 371 (c)(1),
(2) Date: Nov. 25, 2019

(87) PCT Pub. No.: WO2018/218152
PCT Pub. Date: Nov. 29, 2018

(65) Prior Publication Data
US 2021/0069636 A1 Mar. 11, 2021

Related U.S. Application Data

(60) Provisional application No. 62/510,881, filed on May 25, 2017.

(51) Int. Cl.
| | | |
|---|---|---|
| *B01D 53/14* | (2006.01) | |
| *B01D 53/50* | (2006.01) | |
| *B01D 53/52* | (2006.01) | |
| *B01D 53/75* | (2006.01) | |
| *C10L 3/10* | (2006.01) | |

(52) U.S. Cl.
CPC ..... *B01D 53/1468* (2013.01); *B01D 53/1462* (2013.01); *B01D 53/502* (2013.01); *B01D 53/52* (2013.01); *B01D 53/75* (2013.01); *C10L 3/103* (2013.01); *B01D 2251/102* (2013.01); *B01D 2251/11* (2013.01); *B01D 2251/304* (2013.01); *B01D 2251/402* (2013.01); *B01D 2251/404* (2013.01); *B01D 2251/604* (2013.01); *B01D 2251/606* (2013.01); *B01D 2252/204* (2013.01); *B01D 2257/304* (2013.01); *C10L 2290/541* (2013.01)

(58) Field of Classification Search
CPC . C01B 17/0404; C01B 17/0473; C01B 17/05; C01B 17/96; C01B 17/62; C10L 3/102; C10L 3/103; B01D 53/502; B01D 53/52; B01D 53/74; B01D 53/75; B01D 53/78; B01D 53/8612; B01D 2257/302; B01D 2257/304
See application file for complete search history.

(56) References Cited

U.S. PATENT DOCUMENTS

| | | | |
|---|---|---|---|
| 2011/0044875 A1* | 2/2011 | Clarkson | ............... C01B 17/64 423/243.06 |
| 2015/0191656 A1* | 7/2015 | Freel | ...................... C10G 9/28 261/128 |
| 2016/0136573 A1 | 5/2016 | Byers et al. | |
| 2017/0044015 A1 | 2/2017 | Rameshni et al. | |

FOREIGN PATENT DOCUMENTS

WO 2008/100317 A 8/2008

OTHER PUBLICATIONS

Rameshni, Mahin, "Causting Scrubbing vs Sulphuric Acid Production", *Sulphur*, British Sulphur Publishing, No. 337, Nov. 1, 2011, pp. 32-34, and 36.
International Preliminary Report on Patentability from corresponding International Appln. No. PCT/US2018/034657 dated Dec. 5, 2019.

* cited by examiner

*Primary Examiner* — Timothy C Vanoy
(74) *Attorney, Agent, or Firm* — DLA Piper LLP (US)

(57) ABSTRACT

This disclosure provides a method for treating natural gas comprising causing at least some of a sour natural gas stream comprising hydrocarbon gas and hydrogen sulfide to contact an amine or pass through a separation system. A sweet natural gas stream comprising hydrocarbon gas and a waste gas stream comprising hydrogen sulfide are formed by contacting the sour natural gas with an amine or by passing it though a separation device. At least some of the hydrogen sulfide in the waste gas stream is oxidized, forming an exhaust gas stream comprising sulfur dioxide, which is then contacted with water or reactant and water solution or slurry to destroy or convert $SO_2$ into a less environmentally harmful compound.

17 Claims, 1 Drawing Sheet

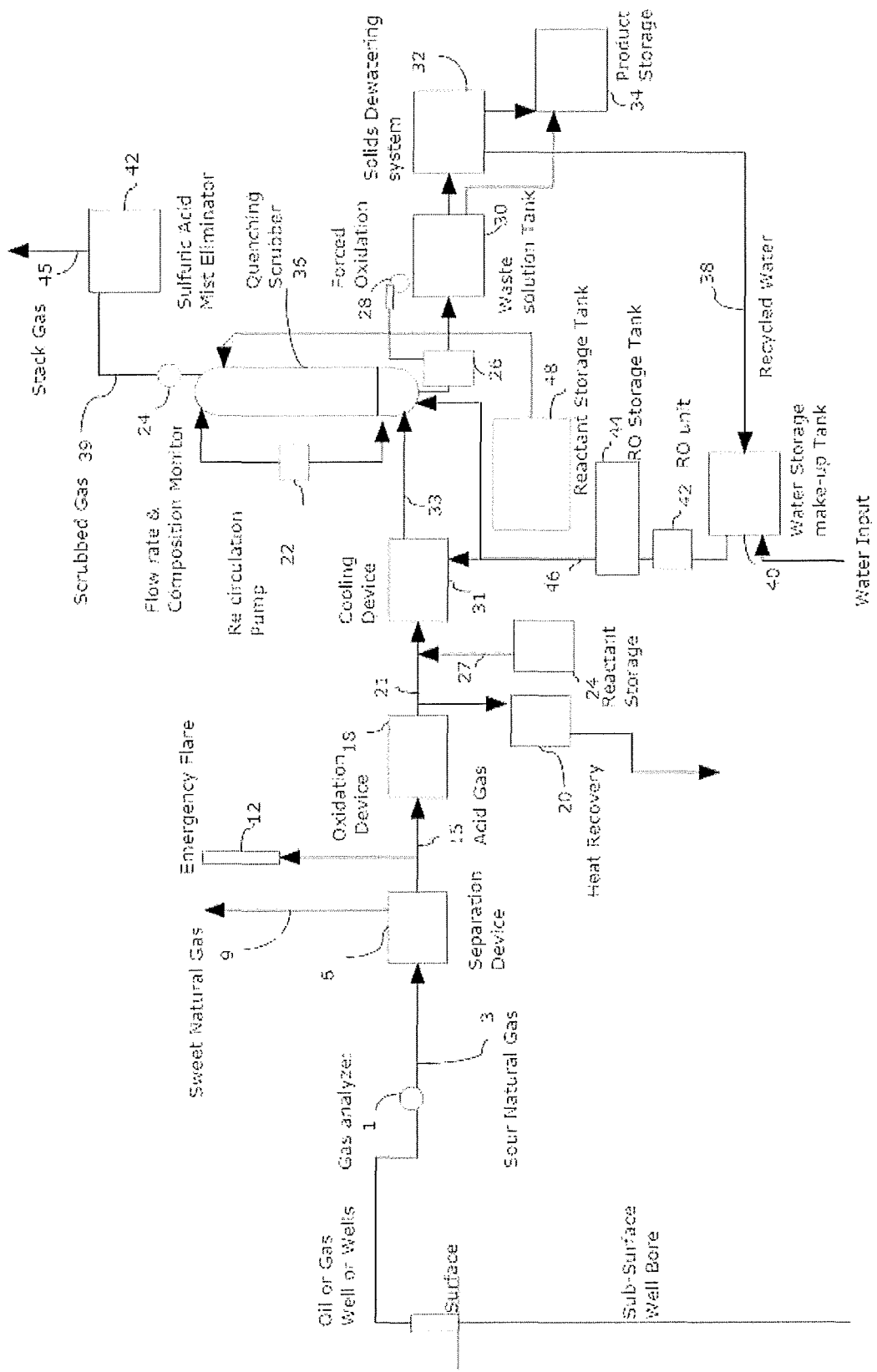

METHODS FOR THE CAPTURE OF GASEOUS SULFUR-CONTAINING COMPOUNDS FROM A NATURAL GAS CONTAINING HYDROGEN SULFIDE

FIELD OF DISCLOSURE

The field of this disclosure is natural gas treatment and pollution control.

BACKGROUND

Sour gas is natural gas or any other gas containing significant amounts of hydrogen sulfide ($H_2S$). Before a raw natural gas containing hydrogen sulfide can be used, the raw gas requires treatment to remove hydrogen sulfide impurities to acceptable levels. Removal and safe disposal of hydrogen sulfide is important because hydrogen sulfide is a highly toxic pollutant and a broad-spectrum poison.

Typically, hydrogen sulfide is removed by converting it to by-product elemental sulfur in a Claus process or it can be treated in a WSA Process unit where the by-product is sulfuric acid. Alternatively, US20130123559 to Milam, for example, discloses a process involving combustion of a hydrogen sulfide stream with an oxidant stream to provide sulfur dioxide and water. However, Milam separates the cooled gas stream from the $SO_2$ for the purification of the $SO_2$ stream, then oxidizes the $SO_2$ into $SO_3$ for the purpose of catalytic conversion into sulfuric acid.

Accordingly, there is a need for a method of economically treating sour gas to remove hydrogen sulfide and convert it into a material safe for the environment while limiting $SO_2$ emissions.

SUMMARY

I provide a method for treating natural gas comprising contacting at least some of a sour natural gas stream comprising hydrocarbon gas and hydrogen sulfide with an amine plant or other separation device to form a sweet natural gas stream comprising hydrocarbon gas and a waste gas stream comprising primarily hydrogen sulfide and carbon dioxide, oxidizing at least some of the hydrogen sulfide in the waste gas stream to form an exhaust gas stream comprised of primarily sulfur dioxide and carbon dioxide, contacting the exhaust gas stream with liquid water, forming an exhaust gas stream containing a water vapor to reduce gas volume and facilitate the downsizing of downstream equipment and contacting the exhaust gas stream containing a water vapor with a reactant and water solution or slurry to form a precipitate or slurry comprising sulfate or sulfite.

BRIEF DESCRIPTION OF THE DRAWINGS

The FIGURE is a block diagram indicating various steps taken in one specific example of a method of treating natural gas.

The accompanying drawings, which are incorporated in and constitute a part of the specification, illustrate various embodiments of this disclosure and serve to explain the principles of the invention. It is to be appreciated that the accompanying drawings are not necessarily to scale since the emphasis is instead placed on illustrating the principles of the invention. The invention can now be described, by way of example, with reference to the accompanying drawings in which the sole FIGURE is a schematic representation of the various stages of the sulfur separation, capture and sulfite, sulfate production process.

DETAILED DESCRIPTION

Natural gas, when initially produced from a natural gas or oil well, i.e., from an underground formation, may contain hydrogen sulfide that must be removed before the natural gas can be used commercially. A hydrogen sulfide-rich natural gas having a hydrogen sulfide concentration of more than 2 ppm is known as "sour gas." This disclosure provides a method for removing hydrogen sulfide by converting hydrogen sulfide to a useful by-product, such as but not limited to calcium sulfite, calcium sulfate, sodium sulfate, sodium sulfite, or an ammonium sulfate or sulfite.

The following description refers to a specific example illustrated in the FIGURE for illustrative purposes only and is not intended to limit the scope of the claims. Turning now to the FIGURE, various aspects of methods for capturing and converting hydrogen sulfide derived from natural gas to harmless by-products are illustrated. These methods have steps any one of which may be found in various specific embodiments, including both those that are shown in this specification and those that are not shown.

In the FIGURE, a natural gas stream 3 recovered from a subsurface formation is treated by the methods of this disclosure. The natural gas stream 3 is directed to an amine plant or other separation process 6 which separates at least some hydrogen sulfide $H_2S$ and carbon dioxide $CO_2$ from the natural gas stream 3. Optionally, a gas analyzer 1 may be used to measure the flow rate and composition of the inlet natural gas stream 3.

The natural gas stream 3 may be separated into the hydrocarbon gas stream (sweet natural gas stream 9) and the hydrogen sulfide and carbon dioxide stream (acid gas 15) by separation device 6, by chemical separation means, e.g. an amine plant. Separation of hydrogen sulfide from the sour natural gas stream 3 may also be performed with a membrane that allows hydrogen sulfide to permeate through the membrane to achieve the separation of hydrogen sulfide $H_2S$ and/or carbon dioxide from the sour natural gas stream 3. In a preferred example, the separation device 6 is an amine plant (also referred to as "amine plant 6") and the natural gas stream 3 is separated into the hydrogen sulfide stream and the hydrocarbon gas stream by contacting and scrubbing the natural gas stream 3 with an amine solvent that removes hydrogen sulfide and carbon dioxide from the feed gas stream by absorbing or chemically reacting with the hydrogen sulfide and carbon dioxide.

The amine plant 6 preferably comprises a gas-contacting skid and an amine regeneration skid and may be in the form of a contacting tower. The gas-contacting skid contains separators which separate out any particulate or liquid within the natural gas stream 3 and then sends the natural gas stream 3 into a contacting tower in the amine plant 6. The natural gas stream 3 preferably enters at the bottom of the contacting tower as the amine, whereas water solution (lean amine) preferably enters from the top and flows down the contacting tower. An exothermic reaction takes place, and the hydrogen sulfide ($H_2S$) and carbon dioxide ($CO_2$) are absorbed from the natural gas stream 3 (creating a "sweet gas" stream 9) and into the amine and water solution (forming rich amine). The rich amine is then pumped to the amine regeneration skid (not shown) which uses heat to remove hydrogen sulfide and carbon dioxide $CO_2$ from the rich amine, forming lean amine to be recirculated to the gas-contacting skid to repeat the process of treating the incoming natural gas stream 3.

The process of removing the hydrogen sulfide $H_2S$ and carbon dioxide $CO_2$ out of the rich amine leaves a more concentrated hydrogen sulfide $H_2S$ and carbon dioxide $CO_2$ stream (sometimes referred to herein as a "waste gas stream" or "acid gas") 15. This waste gas or "acid gas" stream 15 can have different concentrations of chemicals depending on the component chemicals in the inlet natural gas stream 3, but generally the acid gas stream 15 comprises one or more of hydrogen sulfide $H_2S$, carbon dioxide $CO_2$, water and/or water vapor, hydrocarbons, and methyl diethanolamine. The volume and composition of this waste gas stream 15 can depend on the volume and composition of the inlet sour natural gas stream 3, the efficiency of the amine plant 6 and or type of amine solution used.

Generally, after the natural gas stream 3 is separated into a sweet natural gas stream 9 and an acid gas stream 15, the acid gas stream 15 contains more hydrogen sulfide, by volume percent, than the natural gas stream 3, and the sweet natural gas stream 9 contains more hydrocarbons and less hydrogen sulfide, by volume percent, than the natural gas stream 3. Generally, the acid gas stream 15 may contain at least 1 vol. % more hydrogen sulfide than the natural gas stream 3, and may contain at least 5 vol. %, or at least 10 vol. %, or at least 25 vol. %, or at least 50 vol. % or at least 75 vol. %, or at least 90 vol. % more hydrogen sulfide than the natural gas stream 3. The sweet natural gas stream 9 contains at least 1 vol. % less hydrogen sulfide than the natural gas stream 3, and may contain at least 5 vol. %, or at least 10 vol. %, or at least 25 vol. %, or at least 50 vol. %, or at least 75 vol. %, or at least 90 vol. % less hydrogen sulfide than the natural gas stream 3. The sweet natural gas stream 9 contains more hydrocarbons on a volume percentage basis than the natural gas stream 3, and may contain at least 1 vol. %, or at least 5 vol. %, or at least 10 vol. %, or at least 25 vol. %, or at least 50 vol. %, or at least 75 vol. %, or at least 90 vol. % more hydrocarbons than the natural gas stream 3. In a typical example, the sweet gas 9 may contain a max of 4 ppm $H_2S$ and 2% $CO_2$ by volume and the acid gas can contain any percentage of $H_2S$ depending on the ratio of $H_2S$ vs $CO_2$ in the inlet to the amine plant.

The pressure of the acid gas stream 15 exiting the amine plant 6 can be reduced using a pressure regulator if needed before the waste gas stream 15 enters an oxidizing device 18. The oxidizing device 18 may comprise a thermal oxidizer, an afterburner, a combustion chamber and/or the like. The oxidizing device 18 may further comprise one or more of a combustion/retention chamber, natural gas-fired burner, air intake fan, fuel gas train, pilot gas train, safety interlock system controls, and instrumentation. The oxidizing housing 18 may operate with a residence time appropriate for oxidation process to occur and an operation temperature sufficient to achieve a desired destruction efficiency, e.g., ranging from 1,000 to 3,500° F.

The oxidizing housing 18 is preferably operated to produce a sulfur oxide component comprised primarily of $SO_2$ while minimizing $SO_3$ and NOx production. For the purposes of this disclosure, a sulfur oxide component comprised primarily of $SO_2$ means a stream in which at least 50% or more of the sulfur oxide content is $SO_2$. Preferably, at least 75%, at least 80%, at least 85%, at least 90% or at least 95% of the sulfur oxide content of a sulfur oxide component comprised primarily of $SO_2$ is $SO_2$, with a remainder comprising $SO_3$.

A sulfur oxide component comprised primarily of $SO_2$, (where $SO_2$ is at least 90% sulfur oxide content) can be produced by operating the oxidizer 18 at a high temperature upwards of 2,000° F. with low volume of excess oxygen. Suitable volumes of excess oxygen include 0.5-5% of outlet exhaust gas from the oxidizer 18. Low NOx formation can be accomplished with a low NOx burner or an ultra-low NOx burner as are known in the art.

The oxidizer 18 (also referred to as "oxidizing housing") may induce a residence time that facilitates the destruction efficiency of $H_2S$ necessary to meet permit regulations, preferably 99.0 to 99.99% or more destruction efficiency. The oxidizing housing 18 is preferably designed to operate with natural gas as a fuel gas such that, during the oxidizing process, the burner may utilize thermal turndown and be adjusted to varying conditions as indicated by a temperature controller. This is preferable because of the varying conditions and composition of the natural gas stream that enters the amine plant 6, membrane or other separation device upstream, ultimately entering the oxidizing housing 18.

The oxidizer 18, in the event of a shutdown can be isolated and the acid gas 15 can be redirected to a flare 12 by a series of piping and valves. Preferably, the valves may be automatic valves linked to temperature sensors and trip in the event the temperature falls below a normal operating range, indicating that the oxidation process has malfunctioned. A detonation arrestor may also be added to increase safety and reduce the likelihood that combustion would occur upstream of the oxidizing housing 18. The fuel gas train of the oxidizing housing 18 may include an automatic fuel flow control valve that may be modulated by a temperature controller using an electric operator, pressure regulator, low and high gas pressure switches, a strainer, gas safety shutoff valves, and pressure gauges. The pilot gas train may include pressure gauges, pressure regulators, and an automatic igniter with an ignition timer, and solenoid shut-off valves.

After the oxidation process, the exhaust gas 21 comprising sulfur oxides (SOx), gaseous water ($H_2O$), nitrogen ($N_2$), oxygen ($O_2$), and carbon dioxide ($CO_2$) may also comprise trace amounts of carbon monoxide (CO), un-oxidized hydrocarbons, amine compounds, hydrogen sulfide ($H_2S$), and nitrogen oxides (NOx). Heat energy from exhaust gas 21 may be captured so that the heat generated from the oxidation process may be utilized in other processes such as the amine unit 6, which requires heat to operate boilers, by means well known in the art. The heat energy captured may also be utilized to produce electricity any applicable means well known in the art. This may be accomplished through an Organic Rankine Cycle engine, steam turbine, or other means of power generation.

Optionally, after the oxidation process, the exhaust gases 21 existing at temperatures of between 1,000-3,000° F. may be contacted with a fluid, such as water or a reactant/water solution or slurry, prior to being transferred to cooling device 31. The reactant may be one or more of magnesium hydroxide slurry, sodium bicarbonate, sodium carbonate, sodium hydroxide or the like capable of reacting with the $SO_3$ and/or sulfuric acid aerosols in the gas. The reactant may be the injected into the exhaust gas stream 21 by injection nozzles 27 positioned upstream of the cooling device 31. Preferably, the reactants are held in a storage vessel 24 and pumped to the injection nozzles 27. The reactant in storage vessel 24 advantageously absorbs $SO_3$ created during oxidation prior to transferring the exhaust gas to the cooling device 31. The exhaust gas stream 21 will vaporize the reactant fluid and may then flow into the cooling device 31. The purpose of injecting these slurries or solutions into the exhaust gases prior to scrubbing is to reduce the amount of $SO_3$ in the exhaust gas that will create sub-micron sulfuric acid aerosols which will not be captured by the downstream scrubber 36. The remaining sulfuric acid aerosols will be captured by the sulfuric acid mist eliminator 42, which can be a wet electrostatic precipitator, a candle filter, a fiber bed mist eliminator, mesh pad mist eliminator or the like.

In the cooling device 31, the exhaust gas stream 21 may be cooled to the desired temperature and/or reduced in volume. The cooling system 31 may use a pressure drop to collect particulate matter caused by the vaporization of the slurry or solution known as a venture scrubber. The cooling system 31 may be a liquid contacting chamber known as a quench where water is sprayed into the exhaust gas 21 to cool the gas from about 1000-3000° F. to about 100 to 500° F., preferably from 100-200° F. or the saturation point of the gas. Alternatively, the cooling device 31 may be a heat-exchanger that reduces the temperature of the exhaust gas stream 21 exiting the oxidizer 18 by removing heat from the exhaust gas stream 21 with air circulated through the heat-exchanger. Other devices known in the art to be operable to cool the exhaust gas 21 can also be used.

The cooling system 31 may have a flow rate measurement device along with an inlet exhaust gas measurement device. If present, the flow rate measurement device and inlet exhaust gas measurement device may work in conjunction to ensure the proper flow-rate of fluid into the cooling chamber 31. The cooling system 31 may also have a block valve to isolate the fluid contact system either for maintenance purposes or in the event of a malfunction. This may allow the cooling chamber 31 to be adjusted to variations in inlet flow rates. The fluid contact chamber may be an equal pressure contacting vessel or a venture scrubber as known in the art. A venture scrubber operates by taking a pressure drop across the vessel to remove any particulate while contacting the exhaust gas 21 with the reagent and water solution or slurry. The cooling chamber 31 may be an equal pressure vessel and a venture scrubber in series deepening on the inlet conditions of the exhaust gas and contenting fluid. The excess water condensed in the cooling device 31 can be expelled and disposed of or be transferred into the scrubber 36 where it will be circulated.

After the cooling device 31, the exhaust gas and vaporized water or exhaust gas vaporized water and reactant slurry 33 enters the quenching scrubber 36 where it is contacted with a reactant and water solution or slurry. The water vapor and exhaust gas or exhaust gas vaporized water and reactant slurry 33 enters the bottom of the quenching scrubber 36 where gas is quenched to the saturation point if not already at the saturation temperature due to the cooling device. This allows the $SO_2$ to be absorbed by reactant, which can be but is not limited to, calcium hydroxide, lime, sodium hydroxide, lime, sodium bicarbonate, sodium carbonate, ammonia, ammonia hydroxide, magnesium hydroxide, potassium hydroxide or combinations thereof. Depending on the reactant used, on or more of the following chemical reactions may occur.

Chemical Reactions:

Sodium Bicarbonate: $4NaHCO_3 + 2SO_2 + O_2 = 2Na_2SO_4 + 2H_2O + 4CO_2$

Sodium Bicarbonate: $2NaHCO_3 + SO2 = Na_2SO_3 + 2CO_2 + H_2O$

Sodium Carbonate: $2Na_2CO_3 + 2SO_2 + O_2 = 2Na_2SO_4 + 2CO_2$

Sodium Hydroxide: $2NaOH + SO_2 = Na2SO_3 + H_2O$

Ammonia: $4NH_3 + 2SO_2 + O_2 + 2H_2O = 2(NH_4)_2SO_4$

Lime: $2CaO + SO_2 = Ca_2SO_4$

Ammonia Hydroxide: $2NH_4OH + SO_2 = (NH_4)_2SO_3 + H_2O$; $(NH_4)_2SO_3 + \frac{1}{2}O_2 = (NH_4)_2SO$ Calcium Hydroxide: $Ca(OH)_2 + SO2 = Ca(SO_3)_2 + H_2O$; $Ca(SO_3) + \frac{1}{2}O_2 = Ca(SO_4)$ Potassium Hydroxide: $2KOH + SO_2 = K_2SO_3 + H_2O$; $K_2SO_3 + \frac{1}{2}O_2 = K_2SO_4$ Magnesium Hydroxide: $Mg(OH)_2 + SO_2 = MgSO_3 + H_2O$; $MgSO_3 + \frac{1}{2}O_2 = MgSO_4$ Ammonia may be used as a reactant in the quenching scrubber 36 to produce ammonia and ammonia sulfate solution for the use in fertilizer production. The internal working of the quenching scrubber 36 can be a packed medium bed, bubble cap tray, fluidized bed or any other form of internal contactor set up used in the prior art. There may be a recirculation pump 22 that recirculates the solution or slurry at the bottom the scrubbing tower to the top of the scrubbing tower where it may be used to absorb the incoming $SO_2$ from the cooled exhaust stream 33, this recirculation pump may be variable drive so that it may adjust to the flow rate and concentration of the cooled exhaust stream 33.

In the quenching scrubber 36, the pH is maintained at a value of between 7.0 to 11 and preferably at a pH of about 8.0. The reactant compound should be added at a Normalized Stoichiometric Ratio (NSR) of 0.5-2.0 depending on the reactant and desired pH balance desired, and SO2 removal efficiently needed. NSR defined as ((mols of reactant input)/(mols of SO2 in inlet gas))/(theoretical moles of reactant required). After the reactant has contacted at least some of the SO2 within the scrubbing unit and formed sulfite sulfate slurry or solution, the reactant and sulfite/sulfate mixture will be circulated back to the top of the scrubber via the recirculation pump 22. The recirculation pump run continuously while the sulfite and sulfate will be discharged from the scrubber at a dissolved solids concentration of 3% to 20% sulfite/sulfate or based on the pH and level of sulfite/sulfate solution or slurry in the scrubber 36.

The reactant storage tank 48 may hold calcium hydroxide, sodium hydroxide, lime, sodium bicarbonate, sodium carbonate, ammonia and/or the like. The reactant may be pumped to the top of the scrubber 36 where the solution or slurry will then be contacted with the cooled exhaust gas, and react with the $SO_2$ to form sulfite or sulfate salts, thereby capturing and removing the $SO_2$ from the cooled gas stream 33. The sulfite salts will be collected at the bottom of the scrubber. The scrubber can adjust the amount of reactant slurry based on the pH of solution or slurry and a pH sensor can be monitored and more or less reactant can be pumped into the scrubber based on the pH sensor and level controller.

The water make-up tank 40 may supply the water needed for the reactions and may be mixed with the reactant stored in the reactant tank 48 and then pumped to the cooling device 31 and/or directly to the cooling device 31 or the quenching scrubber 36. The water make-up tank 40 can mainly supply the cooling device 31 with water to cool the incoming exhaust gas 21. The water input into the water make-up tank 40 can be produced water from oil and gas activity or fresh water, and the water may be sent to a reverse osmosis unit 42 where the water can be held in the RO storage tank 44. The water make-up tank 40 may supply the cooling device 31 with water for cooling purposes via feed line 46. After the internal water and reactant slurry or solution has been circulated to the desired dissolved solid concentration or pH, the slurry or solution may be sent to a forced oxidation chamber 26. Where the forced oxidation apparatus 28 conveys air to the slurry or solution to oxidize the remaining sulfite to sulfate.

When using calcium hydroxide, ammonia hydroxide, ammonia, magnesium hydroxide or potassium hydroxide, after the reaction with SOx has taken place, the reactants will form sulfite salts. The sulfite salts can be collected at the bottom of the scrubber 36 where they can be further oxidized in an oxidation chamber 26. As shown in the FIGURE, oxidation chamber 26 is external to the scrubber 36 but can be internal to the scrubber 36 and can use a forced air oxidation apparatus 28 to oxidize the calcium sulfite, ammonia sulfite, magnesium sulfite or potassium sulfite to calcium sulfate, ammonia sulfate, magnesium sulfate or potassium sulfate. The addition of oxygen to these byproducts can make them useful as agricultural products.

After the internal water and reactant slurry or solution has been circulated to the desired dissolved solid concentration or pH and oxidized from sulfite to sulfate in the oxidation chamber 26, the slurry or solution may be sent to a waste solution tank 30 where it may await disposal or be sent to a dewatering device, which can be a centrifuge or vacuum drum or vacuum conveyer. Dewatering will help retain water in the system and the recycled water 38 can be returned to the water storage make-up tank 40. The dewatering system 32 advantageously makes the byproduct of calcium sulfate, ammonia sulfate, magnesium sulfate or potassium sulfate into a desirable byproduct. If the by-product does not require dewatering it can bypass the dewatering system 32 and be transferred into the product storage tank 34.

Optionally, the outlet of the quenching scrubber 36 may be provided with a scrubbed gas filter 42 to filter aerosols, such as sub-micron sulfuric acid aerosols not captured by the scrubber 36. The scrubbed gas filter 42 can be a wet electrostatic precipitator, candle filter a fiber bed mist eliminator, mesh pad mist eliminator or the like. The system may also optionally include a gas analyzer 24 on the outlet of the quenching scrubber 36 to measure flow rates, particulate matter, and SOx and sulfuric acid particulate concentrations. The obtained measurements may be used to adjust the concentration of reactant and water solution as well as the circulation rate of the exiting solution within the system as well as monitor emissions of the system. The stack gas 45 preferably contains 95-99.9% less $SO_2$ than the exhaust gas 21.

What is claimed is:

1. A method of capturing and removing gaseous sulfur-containing compounds from natural gas containing $H_2S$, comprising the steps of:
   delivering natural gas into an amine plant or separator;
   separating the natural gas in the amine plant into a sweet natural gas stream and a concentrated waste stream having a $H_2S$ component;
   delivering the concentrated waste stream, containing the $H_2S$ component, to an oxidizer;
   oxidizing components of the concentrated waste stream, including the $H_2S$ component, in the oxidizer to yield an oxidized waste stream comprising sulfur oxide wherein the sulfur oxide is comprised primarily of $SO_2$;
   cooling the oxidized waste stream;
   transferring the oxidized waste stream to a quenching scrubber and reacting $SO_2$ in the oxidized waste stream with a reactant in a water solution or slurry in the quenching scrubber to obtain sulfite or sulfate or salts or a combination thereof; and
   filtering aerosols exiting the quenching scrubber with a scrubbed gas filter.

2. The method according to claim 1, wherein the oxidized waste stream is cooled by contacting the oxidized waste stream with water.

3. The method according to claim 1, further comprising utilizing heat generated by oxidizing the concentrated waste stream to generate power to perform at least one step of the method.

4. The method according to claim 1, further comprising recovering the sulfite or sulfate or salts thereof from the quenching scrubber.

5. The method according to claim 4, further comprising dewatering the sulfate or sulfite salts recovered from the quenching scrubber.

6. The method according to claim 4, further comprising oxidizing sulfite salts to form sulfate salts.

7. The method according to claim 1, further comprising reacting the oxidized waste stream with a second reactant to remove $SO_3$ from the oxidized waste stream.

8. The method according to claim 7, wherein the reactant for removing $SO_3$ from the oxidized waste stream is at least one selected from the group consisting of magnesium hydroxide, sodium bicarbonate, sodium carbonate, and sodium hydroxide.

9. The method according to claim 1, wherein the reactant in the quenching scrubber is at least one selected from the group consisting of calcium hydroxide, sodium hydroxide, lime, sodium bicarbonate, sodium carbonate, ammonia, ammonia hydroxide, magnesium hydroxide, potassium hydroxide or combinations thereof.

10. The method according to claim 1, wherein the reactant in the quenching scrubber is sodium hydroxide solution.

11. The method according to claim 1, wherein the reactant in the quenching scrubber is sodium carbonate solution.

12. The method according to claim 1, wherein the reactant in the quenching scrubber is calcium hydroxide slurry.

13. The method according to claim 1, wherein the reactant in the quenching scrubber is lime water slurry.

14. The method according to claim 1, wherein the reactant in the quenching scrubber is ammonia hydroxide solution.

15. The method according to claim 1, wherein the reactant in the quenching scrubber is sodium bicarbonate solution.

16. The method according to claim 1, wherein reacting $SO_2$ in the oxidized waste stream with the reactant in the quenching scrubber occurs in the presence of water.

17. A system for capturing and removing gaseous sulfur-containing compounds from natural gas containing $H_2S$, comprising:
   an input for natural gas that conveys natural gas to an amine plant or separator;
   an oxidizer fluidly connected to the amine plant or separator for oxidizing $H_2S$ to yield an oxidized waste stream comprising sulfur oxide wherein the sulfur oxide is comprised primarily of $SO_2$;
   a cooling device fluidly connected to the oxidizer for cooling the oxidized waste stream;
   a quenching scrubber fluidly connected to the cooling device for reacting $SO_2$ in oxidized waste stream with a reactant to obtain sulfite or sulfate or salts or a combination thereof; and
   a scrubbed gas filter connected to the quenching scrubber for filtering aerosols exiting the quenching scrubber.

* * * * *